United States Patent
Sheets

(10) Patent No.: US 9,462,762 B2
(45) Date of Patent: Oct. 11, 2016

(54) DRIP IRRIGATION SYSTEM EMITTER AND DIVERTER VALVE ACTUATED BY HYDROPHILIC MATERIALS

(71) Applicant: Timothy B. Sheets, Alameda, CA (US)

(72) Inventor: Timothy B. Sheets, Alameda, CA (US)

(*) Notice: Subject to any disclaimer, the term of this patent is extended or adjusted under 35 U.S.C. 154(b) by 150 days.

(21) Appl. No.: 14/502,958

(22) Filed: Sep. 30, 2014

(65) Prior Publication Data
US 2016/0088808 A1    Mar. 31, 2016

(51) Int. Cl.
| | |
|---|---|
| B05B 15/00 | (2006.01) |
| A01G 25/16 | (2006.01) |
| B05B 15/06 | (2006.01) |
| B05B 1/30 | (2006.01) |
| A01G 25/02 | (2006.01) |

(52) U.S. Cl.
CPC ........... *A01G 25/167* (2013.01); *A01G 25/023* (2013.01); *B05B 1/3006* (2013.01); *B05B 15/008* (2013.01); *B05B 15/062* (2013.01); *B05B 15/069* (2013.01)

(58) Field of Classification Search
CPC .. A01G 25/167; A01G 25/02; A01G 25/023; B05B 15/062; B05B 15/008; B05B 1/3006; B05B 15/069
USPC ........ 239/63, 64, 276, 533.1, 542, 547, 570, 239/571, 575
See application file for complete search history.

(56) References Cited

U.S. PATENT DOCUMENTS

| | | | | |
|---|---|---|---|---|
| 4,739,789 A | * | 4/1988 | Hamilton ............. | A01G 25/167 137/78.3 |
| 5,113,888 A | * | 5/1992 | Beggs .................. | A01G 25/167 137/78.3 |
| 5,148,825 A | * | 9/1992 | Gil ....................... | A01G 25/167 239/63 |

OTHER PUBLICATIONS

Timothy Sheets, Drip Irrigation System Valve Actuated by Hydrophilic Material. Invention disclosure made to Hunter Industries, San Marcos, California on or about Jan. 29, 2010.

\* cited by examiner

*Primary Examiner* — Steven J Ganey
(74) *Attorney, Agent, or Firm* — Craig M. Stainbrook; Stainbrook & Stainbrook, LLP

(57) ABSTRACT

A drip irrigation system valve for placement directly onto soil, including a valve chamber defining an interior space and having an open bottom in fluid communication with the soil onto which it is placed; a water inlet in fluid communication with said interior space and having a valve seat disposed on an interior end; a base stake connected to said valve chamber for insertion into soil; a platform for supporting an expandable member; an expandable member disposed on said platform within said interior space; a valve membrane disposed within said interior space above said expandable member and having an upper side and a lower side and which defines a water reservoir within said interior space above said upper side and which prevents water entering into said valve chamber and from directly contacting said expandable membrane; and a valve seal disposed on said upper side of said valve membrane immediately above said expandable member for sealing engagement with said valve seat when said expandable member is wetted and in an expanded state.

20 Claims, 14 Drawing Sheets

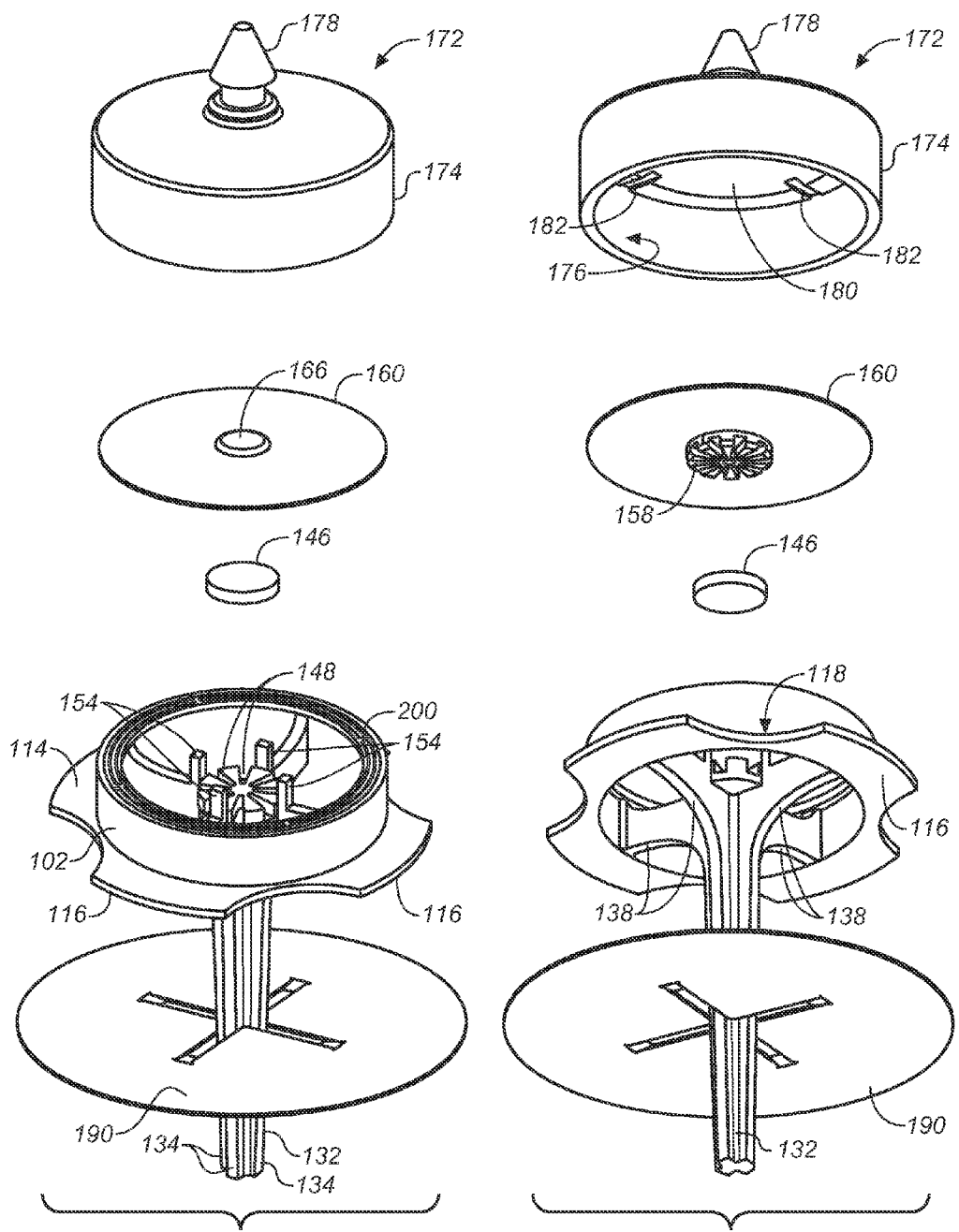

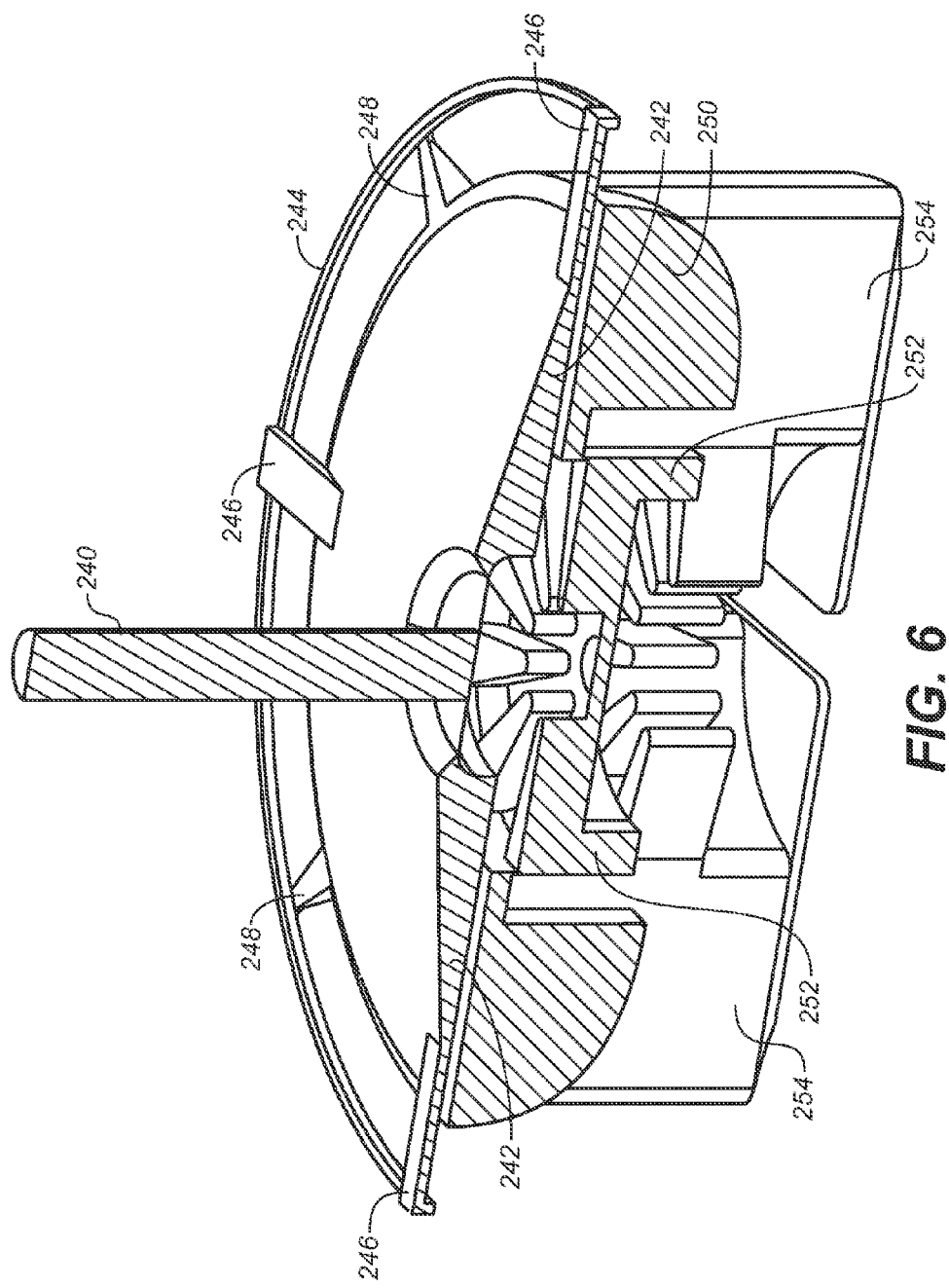

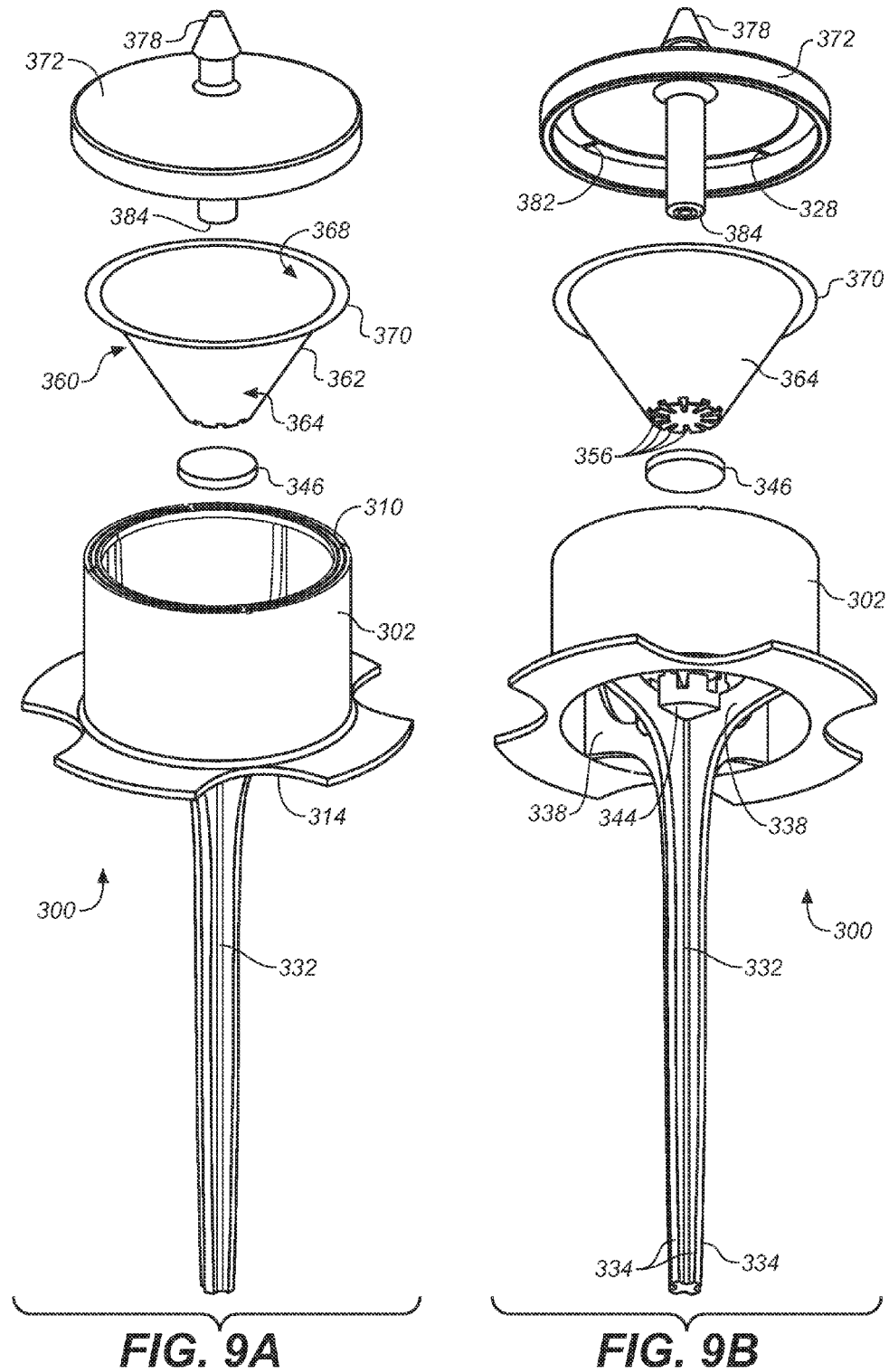

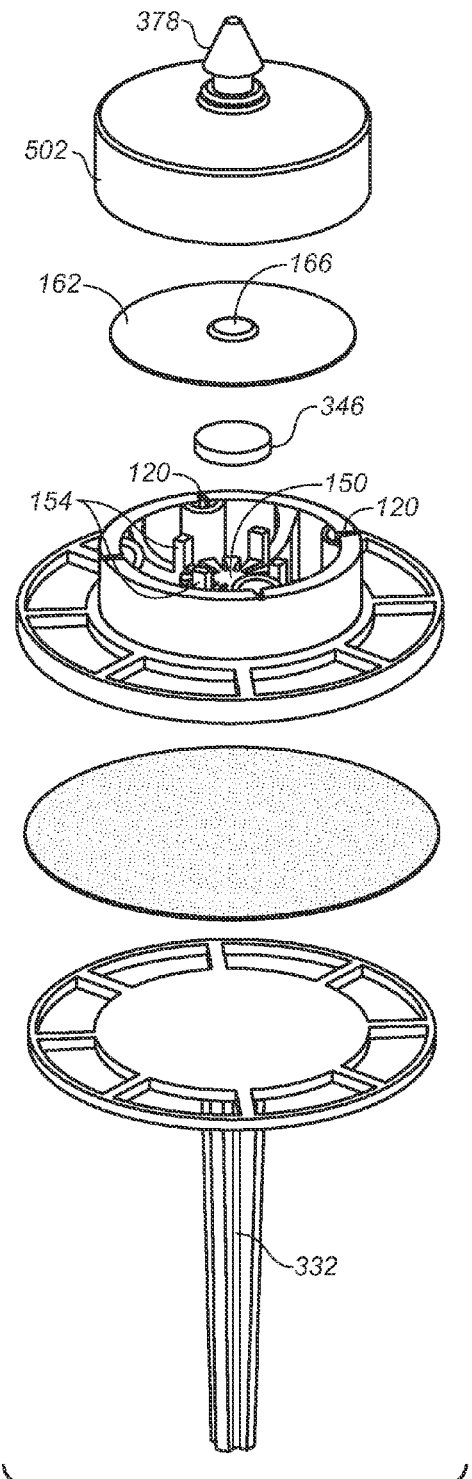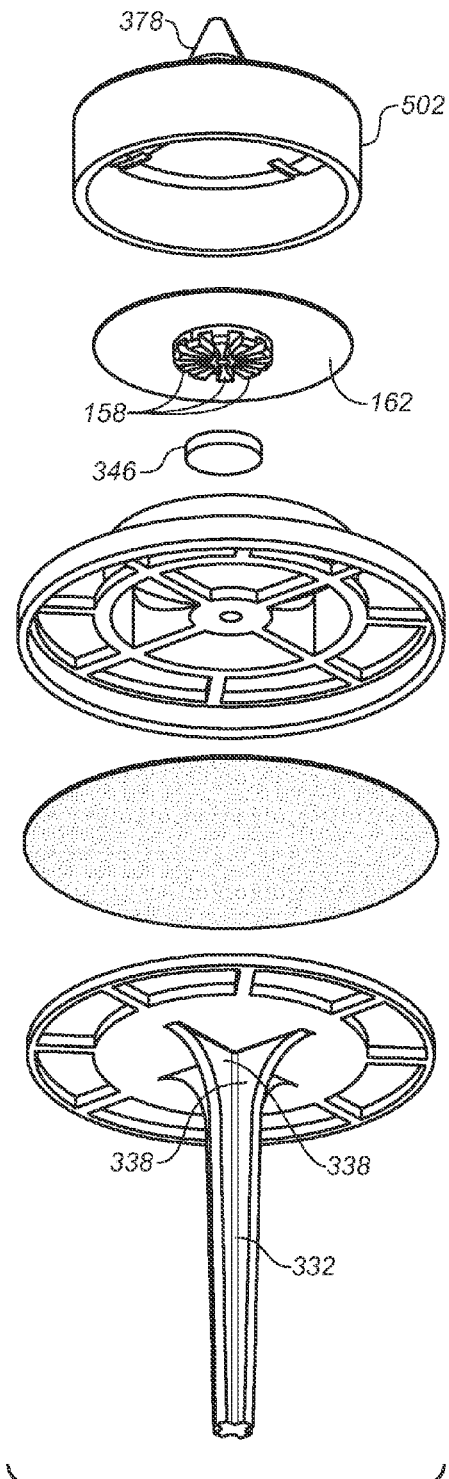

DRIP IRRIGATION SYSTEM EMITTER AND DIVERTER VALVE ACTUATED BY HYDROPHILIC MATERIALS

CROSS REFERENCES TO RELATED APPLICATIONS

Not applicable. The present application is an original and first-filed United States Provisional Patent Application.

STATEMENT REGARDING FEDERALLY SPONSORED RESEARCH OR DEVELOPMENT

Not applicable.

THE NAMES OR PARTIES TO A JOINT RESEARCH AGREEMENT

Not applicable.

INCORPORATION BY REFERENCE OF MATERIAL SUBMITTED ON A COMPACT DISC

Not applicable.

BACKGROUND OF THE INVENTION

1. Field of the Invention

The present invention relates to generally to drip irrigation system water valves, and more particularly to a mechanical soil moisture sensing device and drip irrigation valve and/or emitter with a built-in valve assembly in which water flow is controlled by hydrophilic material that opens and closes a valve in response to the presence and the absence of water permitted to enter the valve assembly.

2. Background Discussion

Drip irrigation changed how farmers, horticulturalists, and agronomists, water plants. The spot watering provided by a drip system irrigates plants more precisely. Drip systems use timers to operate solenoid controlled valves to turn on sections of main feeder lines. Larger hoses feed smaller ones, which connect to soaker hoses, drippers, and sprayers. Employing drip systems saves water. However, drip systems do not take into account variations in soil moisture content from one area to another. Water retention in soil is determined by soil type, heat, shade, wind, humidity and plant growth. Nothing in currently existing drip systems is designed to change water flow from dripper to dripper in response to such changing conditions. Electronic soil moisture devices have been developed to control watering, but they are only used to control the delivery of water to large irrigation zones. To date, despite numerous attempts to make a mechanical device that automatically controls water delivery to particular plants or very small watering zones, none have made it to market.

Drip irrigation systems are renowned for their efficiency, delivering restricted volumes of water in a slow and sustained fashion and only to the soils immediately surrounding plant roots. The rate at which the water is delivered ensures significant horizontal migration of the water, as well as vertical percolation down deep, and thus a thorough soaking of the soils.

As with nearly all extensive irrigation systems, drip irrigation systems that cover multiple watering zones are frequently controlled by valves set on programmable electronic timers. Watering zones are generally defined both by the particular area covered by a related set of emitters, and plants in each zone preferably have similar needs for water and sunlight. When control within zones is required, emitters for individual plants can be selected according to their flow rate per hour. Most emitters that drip directly onto soil deliver between V2 to 2 gallons of water per hour, though greater and more restrictive flow rates are available. Thus, plants scheduled for watering in the same time frame and on identical water lines can receive vastly different amounts of water. These elements of control—control valves and emitter types—contribute significantly to the overall system efficiency of the system and dramatically reduce water waste.

However, as efficient as they may be, even drip irrigation systems can be wasteful or deficient. This is because there are numerous factors even within small watering zones that affect the watering needs of particular plants, and emitters on such general control systems are simply not sufficiently respond to the needs of a particular plant in a particular location under ever changeable conditions—changing sun affecting plant metabolism rates, changing precipitation that may change even the need to water, changing temperatures and changing winds that affect transpiration and evaporation rates, and so forth. These factors highlight the difficulty in defining watering zones and plant watering needs on a plant-by-plant or a very small sub-zone basis. Thus, there remains a need for a drip system emitter that responds to the needs of the particular plant or group plants to which it delivers water by automatically adjusting its flow rate in relation to the actual soil water content, which is, in turn, based on all of the foregoing factors, plus some less changeable factors, such as soil drainage and saturation capacity.

There are presently no products in the market that solve these problems, most likely due only to the complexity of providing a successful and economically practicable product. Other devices employing expandable material (EM) as a valve on/off device have been proposed, but all fail in several important respects. Notably, devices leave the EM in contact with soil or via a conduit, and in such cases the EM becomes contaminated and ceases to work. In other cases the EM properties are never fully defined and may expand in nearly every direction such that they deform over time. Either the confined space in which they are placed does not accommodate such expansion or does not address how they will dry.

An EM needs air contact to dry, and to dry efficiently it must be small and expand only slightly with a small amount of water. To work properly, it must be rigid when fully expanded. Testing has shown that a 35% expansion from its size in a dry state is usually indicative of a material which offers the right characteristics to activate a valve and not deform over time. The prior art devices have failed to appreciate and to achieve these operating parameters.

Many devices are deployed in an "always on" EM device. Such devices cannot ever work properly for the present purposes. In such devices when the EM starts to dry, it causes the valve to leak well before the valve comes on, fully rewetting the EM and shutting the valve again before any appreciable amount of water is released. This problem causes plants to be under-watered and thus to render the device useless.

There must be a delay between the EM wetting and expansion during its wetting to keep the valve from shutting off prematurely and thus before full watering is achieved.

Further, the EM can never be in direct contact with the soil or via a conduit (like a wick) because micro pours in the EM will clog when contaminated preventing rewetting.

Accordingly, the EM must have only indirect contact with the soil, and this is a novel feature of the present invention. And it must have a direct relationship with the moisture content of the soil. If the EM closes the valve only at its fully expanded size, as it dries it will correspondingly open the valve too quickly, before the soil has dried sufficiently. This will cause a leak and throw off the reading, and it will cause overwatering.

Further, the EM must be quite small so that it can dry quickly and it must expand slowly enough that it does not shut off the valve during a watering cycle.

In the known art, most EM systems are simply too complicated and therefore commercially not viable. None take into account how an EM truly expands. Most fail to take into account how a valve will clog if exposed to air through calcification or material degradation. None have valves which function fully on or off. Variations in water flow will cause improper watering. Because they are not switches with simply on/off states, they need to expand into something that keeps the valve closed through a whole range of expansion distances.

Some published patents have attempted to address one or more of the problems set out above. None have led to the development of a viable product that works as needed. Exemplary patents include:

For instance, U.S. Pat. Appl. Pub. No. 2007/0277879 by Anderson, et al, teaches an irrigation control valve that uses a moisture sensitive element in contact with the soil and which expands or retracts depending on the moisture within adjacent soil. The moisture sensitive element is coupled to a moisture controlled member, and the moisture controlled member is moved further into the conduit with increasing moisture in the soil. The moisture controlled member and an electronically controlled member are located adjacent each other at the conduit. The electronically controlled member determines how far the moisture controlled member needs to move in order to fully block the flow of water in the conduit. An electronic controller is operable to determine the achieved level of moisture in the soil, by means of the electronically controlled actuator and the electronically controlled member.

U.S. Pat. No. 4,696,319, to Gant, discloses a moisture-actuated apparatus for controlling the flow of water by expanding when absorbing moisture from and contracting when emitting moisture into a moisture-conducting medium. Actuation is binary, with one state resulting from expansion of an actuating element when it absorbs moisture from a water-conducting medium; a second state results from the contraction of the actuating element when the element emits moisture into the medium. The actuating element includes a hydrophilic material disposed in a matrix of wicking material. In one embodiment the absorptive expansion is used to provide a high-moisture signal in the same embodiment, contraction of the element produces a low moisture signal for opening the valve. In other embodiments, the expansion and contraction of the actuating element is used to directly actuate a valve.

U.S. Pat. No. 5,113,888 to Beggs, describes a moisture sensitive irrigation valve interposed between a water source and a water outlet and which responds to changes in soil moisture. A diaphragm operatively connecting a water inlet and an outlet through a seal and reciprocates between open and closed positions. The diaphragm movement is restrained by pneumatic pressure opposing the water inlet pressure. In addition, a check valve is provided whereupon a moisture sensor disposed at a terminal portion of the device directly reading moisture level in the soil allows unidirectional air flow for self-purging of the sensor.

U.S. Pat. No. 5,148,825 to Gil et al teaches a moisture-responsive valve having a housing with an internal chamber, and water inlet and outlet openings. A valve assembly in the chamber includes a water-absorbing expansible body within the housing adjacent a moisture-permeable wall for controlling the movements of the valve member in response to the moisture passing through the moisture-permeable wall. The valve member is floatingly mounted between a first spring interposed between the valve member and the housing and urges the valve member away from the valve seat, and a second spring interposed between the valve member and the water-absorbing body and urges the valve member towards the valve seat.

U.S. Pat. Appl. Pub. No. 20040139650, by Haq, discloses an automatic watering system for that operates on moisture sensitive substance that deforms due to the absorption of moisture in the soil. In turn, it operates a valve through mechanical, electrical or chemical means. Valve operation selectively allows water to flow from a water chamber when the soil is dry. Water flow stops as the moisture content reaches a certain level in the soil.

None take into account freezing, which can damage all the devices.

The foregoing patents reflect the current state of the art of which the present inventors are aware. Reference to, and discussion of, these patents is intended to aid in discharging Applicants' acknowledged duty of candor in disclosing information that may be relevant to the examination of claims to the present invention. However, it is respectfully submitted that none of the above-indicated patents disclose, teach, suggest, show, or otherwise render obvious, either singly or when considered in combination, the invention described and claimed herein.

BRIEF SUMMARY OF THE INVENTION

The present invention solves the problems farmers, gardeners, horticulturalists, and home owners face with conventional drip systems; every drip site potentially has different watering need. Electronic moisture meters used for controlling an entire drip irrigation system work only in the vicinity where the system emitters or sprayers are placed. They do not take into account all the variations introduced by differing exposures to shade, wind, heat, cold, relative humidity and different rates of plant water uptake from different varieties of plants. They are also constrained economically to be able to compete in the marketplace against the cost of water (though this is becoming increasingly less of a concern with water shortages and higher water costs).

All drip systems require timers to control drip cycles. The cycles are designed to match the needs of the plants as closely as possible, and this is accomplished by varying the flow rates of each drip emitter, the duration of the drip cycle, and the number of times a week. With the present invention, guess work is entirely eliminated.

The present invention is not designed to be continually on (under water pressure) or where highly porous (sandy) soils need constant watering. However, sandy soils will still benefit from the present invention during rains because the device will shut off during any soil wetting event.

Growers using the present invention will not have to worry about their selections of fertilizers or soil, or about changing out drippers as plants grow, or about turning off a system when it rains. The present invention addresses each of these problems.

There is one problem vexing all drip systems face: hard water. In most cases, a functioning drip irrigation system requires that the system water supply be treated with descalant and anti-mineralization chemicals, typically to acidify the water. The present invention addresses this problem, too.

There are two preferred embodiments of the present invention, a first denominated a direct water contact device (DWCD), the second denominated an indirect water contact device (IWCD). They differ only in how the expandable material (EM) is wetted: the DWCW is wetted by incoming water and the IWCD from collected condensation; otherwise the devices are functionally the same. Structurally, the DWCD uses a polymer is used as the expandable material; the IWCD uses a quickly expanding material.

Both the DWCD and the IWCD can act either as a dripper or a valve for remote drippers or sprayers. Both take into account the varying expansion distances of the EM through compressible seats. Both always have water around the valve seats to reduce calcification and mineral deposition. Both have chambers that trap moisture from the ground to maintain the EM in an expanded size or to dry it as the soil dries. Both have platforms and valve surfaces that oppose the EM with grooves to help wet and dry the EM. Both have stakes to secure the devices to ground. Both have hygroscopic screens or filter fabrics to keep contamination out yet allow for the transpiration of moisture and humidity. Both have a ground plate that helps to keep the device on atop the soil and in the ground and cutouts to expose the hygroscopic screen to the atmosphere helping to dry the interior of the device. Both have valve membranes that deform under pressure from incoming water and that press down hard on the EM so that the valve opens fully during an on watering cycle.

The foregoing summary broadly sets out the more important features of the present invention so that the detailed description that follows may be better understood, and so that the present contributions to the art may be better appreciated. There are additional features of the invention that will be described in the detailed description of the preferred embodiments of the invention which will form the subject matter of the claims appended hereto.

BRIEF DESCRIPTION OF SEVERAL VIEWS OF THE DRAWINGS

The invention will be better understood and objects other than those set forth above will become apparent when consideration is given to the following detailed description thereof. Such description makes reference to the annexed drawings wherein:

FIG. 2A is an upper exploded perspective view thereof;

FIG. 2B is a lower exploded perspective view thereof;

FIG. 6 is a cross-sectional upper perspective view thereof, taken along section line 6-6 of FIG. 5;

FIG. 9A is an exploded upper perspective view thereof;

FIG. 9B is an exploded lower perspective view thereof;

FIG. 12A is an exploded upper perspective view thereof; and

FIG. 12B is an exploded lower perspective view thereof.

DETAILED DESCRIPTION OF THE INVENTION

Figures 1, 2:
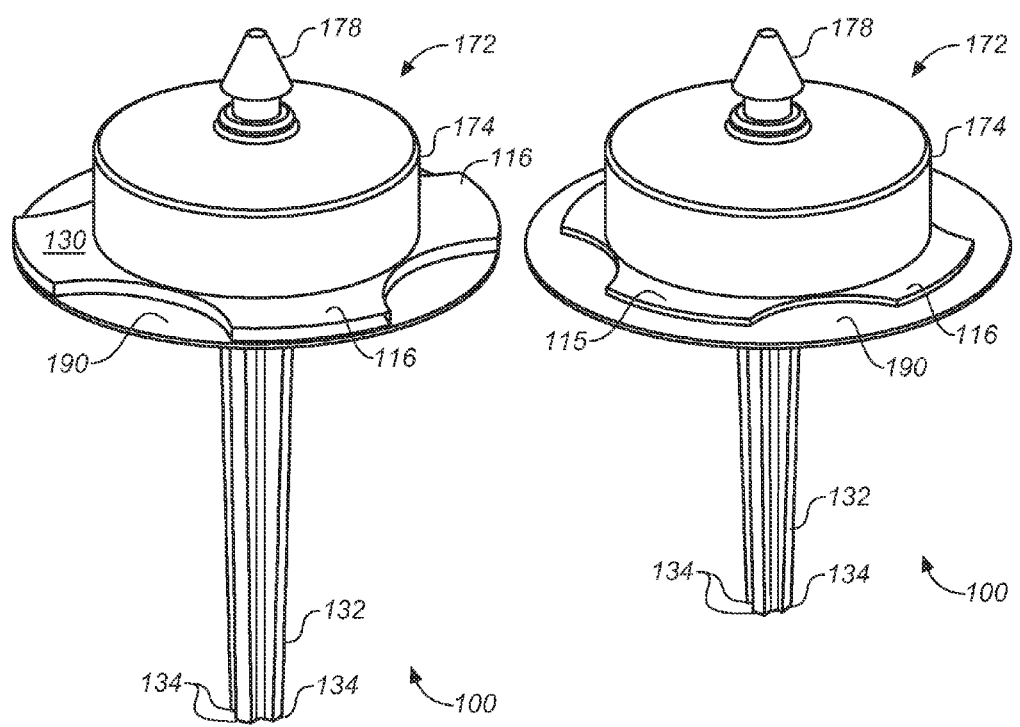
FIG. 1 is an upper perspective view showing a first preferred embodiment of the inline drip emitter of the present invention.
FIG. 2 is an upper perspective view showing a variation on the first preferred embodiment having a modified upper rim of the base to include rim channels.

Referring to FIGS. 1 through 12B, wherein like reference numerals refer to like components in the various views, there is illustrated therein a new and improved drip irrigation system emitter and diverter valve.

FIGS. 1-8B illustrate a first preferred embodiment of the inventive emitter and diverter valve, generally denominated 100 herein. These views collectively show that the inventive emitter and diverter valve comprises a base 102 having a valve chamber 104 preferably cylindrical and thus having a cylindrical exterior side 106, a cylindrical interior side 108, an upper rim 110, and an exterior lower edge 112, which terminates on the exterior side 106 at a ground plate 114 having a plurality of outwardly radiating tabs 116 defining gaps or spaces 118 therebetween which expose the fabric screen or filter fabric directly to atmosphere and soil, discussed more fully, below.

In a first variation of the first preferred embodiment (FIGS. 1A-1B), the upper rim 110 includes a plurality of transverse channels or grooves 120 which extend from the interior side 108 across the rim to the exterior side 106 but which angle inwardly toward the interior side 108 of the valve chamber 104.

The ground plate 114 includes a center opening 124 having a diameter corresponding to that of the interior side 108 of the valve chamber, such that the interior side extends downwardly to terminate at an interior lower edge 126 coplanar with the bottom side 128 of the ground plate 114. The top side 130 of the ground plate, defined by the plurality of tabs 116, is also generally planar.

Next, the base includes a base stake 132, preferably slightly tapered, and having a plurality of splines 134. As an extension of the upward tapering, the splines expand in depth and eventually flare at the upper portion 136 of the base stake and radiate out into robust spokes 138 that connect to the interior side 108 of the valve chamber 102 thus rigidly connecting the upper portion of the base stake to the valve chamber. The central portion 140 of the upper portion 136 of the base stake 132 includes a recess 142 in which is disposed a platform 144 for supporting an expandable material (EM) disc. The platform, which is preferably disc-shaped to conform to the EM when fully expanded, includes a plurality of grooves 148 which radiate from the center 150 of the platform to the outer edge 152 of the platform.

A plurality of pins 154 defines the outer perimeter of the platform in which the EM disc is disposed. The pins extend upwardly beyond the upper surface 156 of the EM disc so as to extend the space in which the EM disc is disposed into a space into which a disc-shaped boss 158 with radial grooves part of the valve 160 is disposed. The valve boss 158 is preferably integral with a resilient valve membrane 162, and depends downwardly from the center of the bottom side 164 of the valve membrane. A valve seal 166 is disposed on the upper side 168 of the valve membrane. Note should be taken that the diameter and thus the perimeter edge 170 of the valve membrane are carefully tailored for spacing from the apparatus top, described in the paragraphs immediately following. The valve seal is preferably fabricated from a compressible material having a Shore 00 hardness of approximately 50.

The assembly next includes a top 172, having a cylindrical exterior side 174 and a cylindrical interior side 176 with an interior diameter closely matched to that of the exterior side 106 of the valve chamber 102. The top includes a barbed water inlet 178 disposed generally in the center of the top, but alternative positions are possible. The underside 180 of the top are provided with radially oriented fluid channels 182 in the flat portion, which creates a seal to the membrane and facilitating water flow to the edge of the upper rim of the valve chamber. In addition, the underside 180 of the top includes a valve seat 184 (FIG. 4 only), which is essentially a valve boss or downward projection providing a suitable surface for sealing contact with the valve seal 166. Between both fluid channels 182 and valve seat 184, top 172 is domed, thereby acting as a reservoir to keep the valve submerged and to provide an area that amplifies the water pressure on the valve.

In assembly, the EM disc is placed onto the platform 144 of the valve chamber and the valve is then placed over the EM disc so that the valve stem 158 is disposed between pins 154. The pins function as a stop to prevent the valve boss, and therefore the valve membrane, from migrating laterally to maintain the perimeter edge 170 of the valve membrane 160, which has a smaller diameter than cylindrical interior side 176 and valve chamber 104 creating channels for water to flow from top 172 to the valve chamber by flowing over the perimeter edge and onto the upper rim 110 of the valve body. The top 172 is either securely press fit over and onto the base 102, or it is glued, welded, or, alternatively, threadably coupled to the base by providing the top interior side with male or female threads and the exterior side of the base with complementary threads (not shown but well known in the art). Thus, the EM disc and valve are captured and secured by the placement over and in between the pins and held down tight to the base by the lid. Once the EM disc is placed on the platform and the valve boss disposed between the pins, neither can move lateral so as to become operationally displaced.

Figure 4:
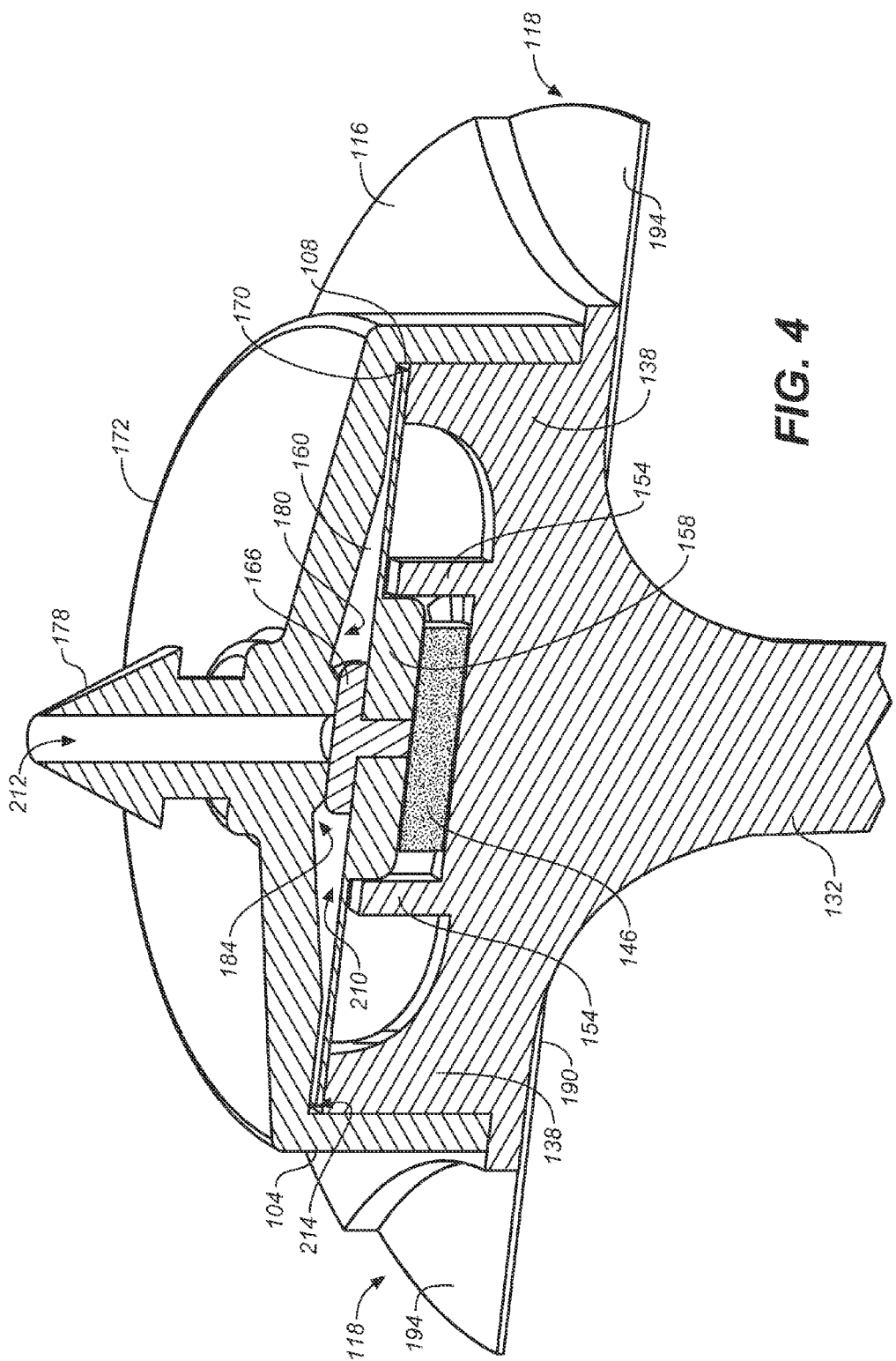
FIG. 4 is a cross-sectional upper perspective view of the inline drip emitter of the first preferred embodiment and its variation as shown in FIGS. 1-3.

After assembly, a fabric screen 190 having a center hole 192 configured to accommodate the splines 134 up to and including a portion of the expansions extending into the spokes 138, so as to allow placement over the base stake 132 up to the point where the fabric screen is approximated to the bottom side 128 of the ground plate 114, best seen in FIG. 4. The fabric screen covers the bottom and is sized such that there are uncovered portions 194 of the fabric screen in the spaces 118 between tabs 116 are exposed to air. The fabric screen is preferably fabricated from a spunbond nylon fabric (or another non-decomposing fabric co-molded or glued to the bottom of the ground plate. It is preferably approximately 0.015 inches in thickness. The material wicks water efficiently and allows it to pass downward and upward through the fabric and into the soil and air, which it also prevents debris from entering the valve chamber.

The apparatus may include a plurality of bosses. In a possible leaking event, they would force the drips down to the filter fabric, away from the EM, where they would be harmlessly absorbed into the soil keeping the reading of the soil's moisture content true to the drying size of the EM. Then, in the next watering cycle the EM will be contracted enough to allow full flow into the chamber, which fills with water, fully wetting the polymer. The radial grooves keep wetting it after the cycle is terminated.

Figures 1A, 1B:
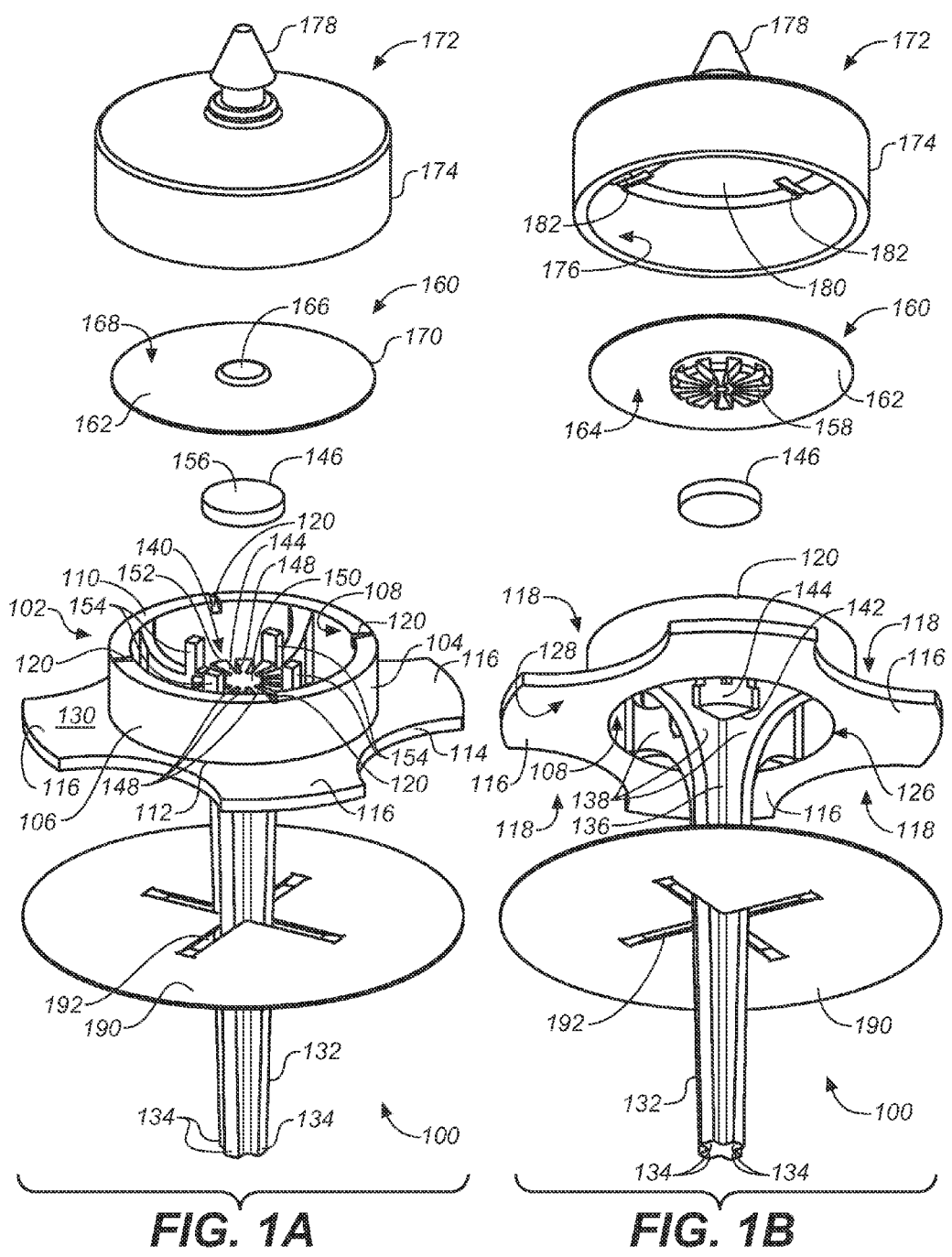
FIG. 1A is an upper exploded perspective view thereof.
FIG. 1B is a lower exploded perspective view thereof.
Figure 3:
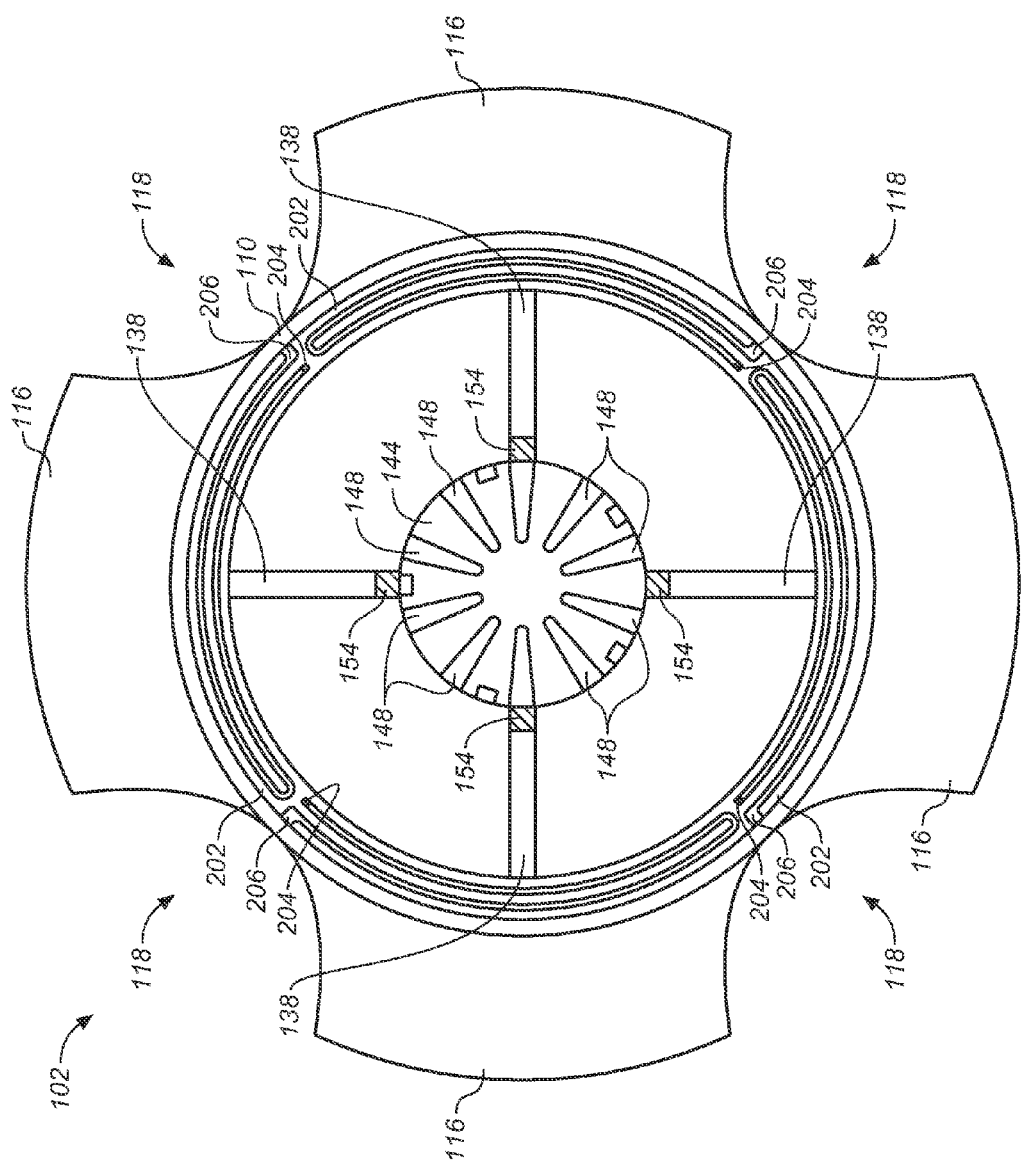
FIG. 3 is a top plan view of the base of the inline drip emitter of FIGS. 2A and 2B, shown with the top removed and no filter fabric installed.

Looking next at FIGS. 2A through 3, there is shown a slight variation on the first preferred embodiment of the present invention, wherein an alternative fluid channeling system 200 is provided. Specifically, there is shown a valve body 102 having an upper rim 110, that includes not a plurality of transverse micro-channels as shown in FIG. 1A, but a plurality of arcuate U-shaped micro-channels 202 that include an open end 204 and a closed end 206, the former into which water will flow as it is directed to the upper rim over the top side (upper surface) 168 of the valve membrane and over the perimeter edge 170, which is spaced apart from the interior side 108 of the valve chamber 102. Depending on the flow rate permitted by the microchannel dimensions, water is permitted to drip along the interior sides only of the base or to be directed to the EM disposed atop the valve platform 144. Micro channels may be sized to restrict the flow rate of water so as to convert the device into a dripper instead of a co-molded valve. This modified upper rim may also be used in conjunction with the condensation collector shown in FIG. 9A et seq., discussed fully below.

FIG. 2 also shows the top 172 adapted for use with the alternative rim with U-shaped micro-channels. This top is structured identically to the top of FIGS. 1A and 1B, including fluid channels disposed in the underside of the top.

When assembled, there are voids and spaces defined by the structural elements, some of which constitute spaces into which water will flow. Included among them is the valve space 210 between the top side 168 of the valve 160 and below the underside 180 of the top 172. The water inlet 178, of course, includes an inlet opening 212, which extends down to and through the valve seat 184, such that when the valve seal is separated by the lift distance of the valve seal, water is allowed to flow through the inlet and water to be introduced into the valve space 210. The perimeter edge 170 of the valve membrane 162 is spaced apart from the interior side 108 of the valve chamber so as to form a perimeter fluid channel 214 in which water can flow. Water introduced into the valve space 210 through inlet opening 212 when the valve is open will flow outwardly along the upper surface of the top side of the valve membrane 162 until it reaches the perimeter edge 170 of the valve membrane, over which it will flow and come into engagement with the upper rim 110 of the valve chamber. It will then flow along the rim until it is discharged into the valve chamber through one of the transverse micro-channels 120 or the U-shaped arcuate micro-channels 202. The micro-channels provide backflow pressure and restrict the rate of flow to ensure that the valve forcefully opens and to adjust the flow so that the apparatus truly functions as a drip emitter discharging water at a predetermined rate (e.g., 1 gpm).

Figure 5:
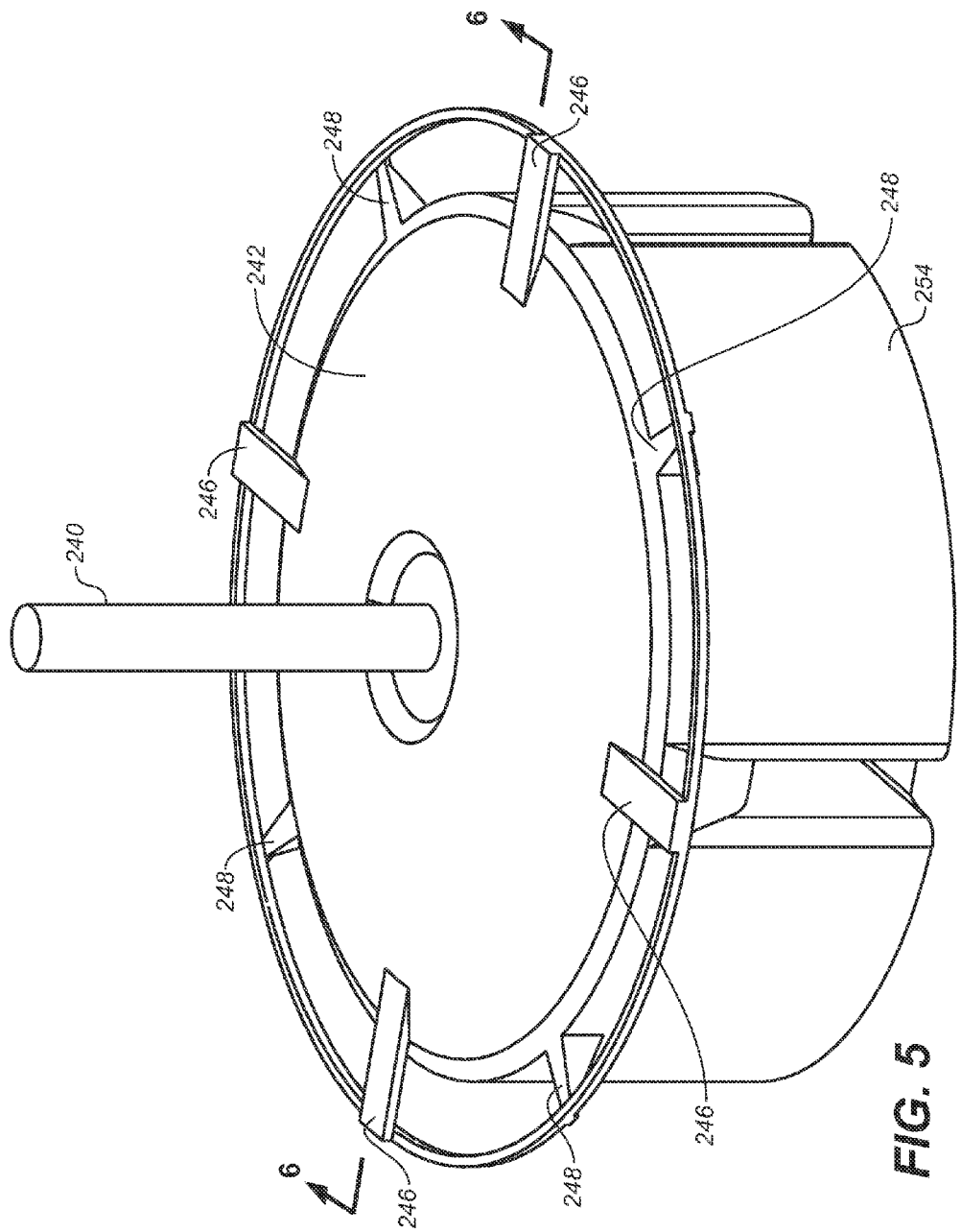
FIG. 5 is an upper perspective view showing the collective water space in the first preferred embodiment of the inventive

FIGS. 5-6 provide a three dimensional picture showing the water space defined by the apparatus structure in assembly. This facilitates a clear way to visualize the body and volume of water potentially filling the emitter or valve, assuming every space were entirely filled. While such a condition is highly unlikely to occur, the image is nonetheless helpful in envisioning the voids and fluid fill spaces.

Inlet water 240 in introduced into the emitter through the water inlet 178 shown in FIGS. 1A through 2B. If the valve seal is not seated on the valve seat, water 242 will flow into the reservoir or valve space 210 and then over the perimeter rim of the valve membrane into the valve perimeter channel 244. If radially oriented top channels are provided, as seen in FIG. 1B, water 246 will flow along the underside of the top and into the valve perimeter channel 244 between the perimeter edge of the valve membrane and the interior side of the valve chamber. From there the water may flow as seen at 248 through the transverse micro-channels (element 110 in FIG. 1A) into the space in the valve chamber where it can potentially be a large volume of water 250, though in practice it will flow so slowly as to drip down along the interior side of the valve chamber. Another space of note is that between the EM disc and valve into which water 252 can flow to wet the EM disc. Finally, the valve assembly defines a water/air exchange area, defined herein to be the volume in the valve chamber below the upper edge of the spokes 138 and above the fabric screen 190.

Figure 7B:
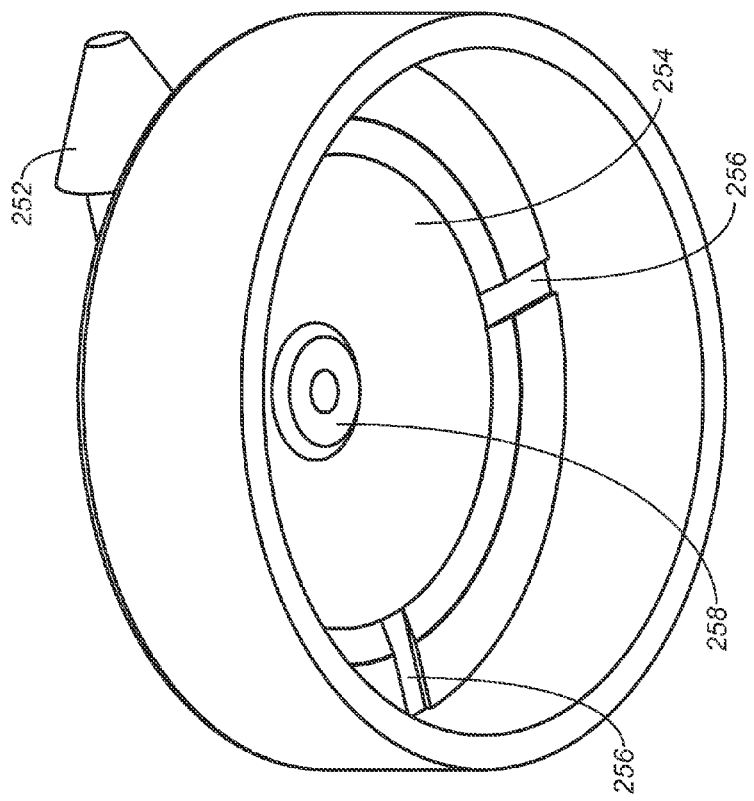
FIG. 7B is a lower perspective view thereof.
Figure 7A:
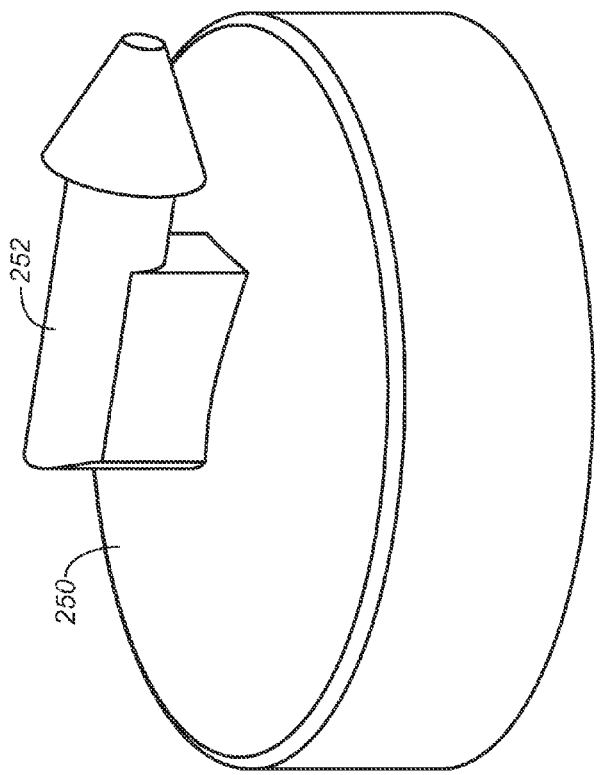
FIG. 7A is an upper perspective showing a lid variation with an angled water inlet.

FIGS. 7A and 7B show an alternative top 250 having an angled water inlet 252. The underside 254 includes radially oriented fluid channels 256, and the valve seat 258 is clearly shown.

Figure 8A:
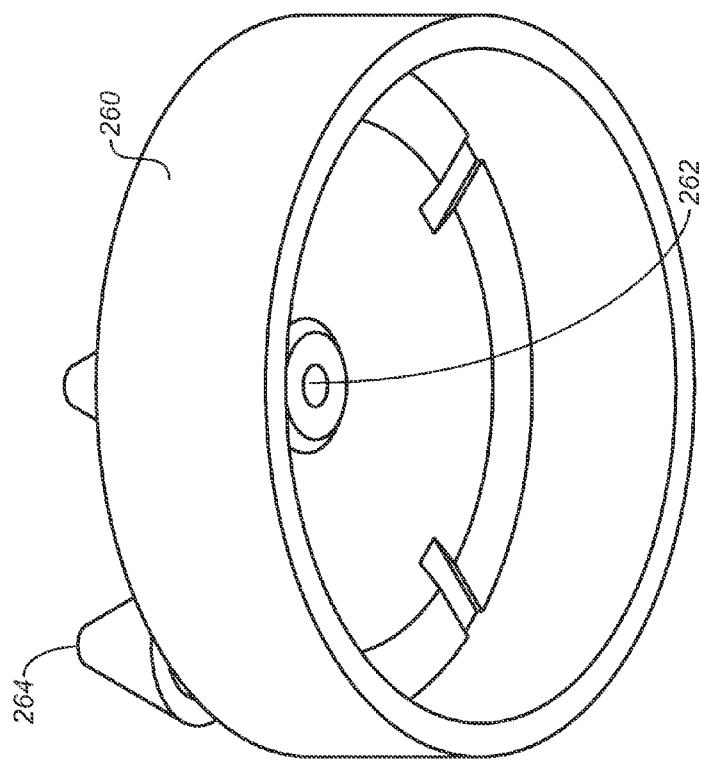
FIG. 8A is an upper perspective view of a top employed when the inventive apparatus is used as a diverter valve for downstream drip emitters.
Figure 8B:
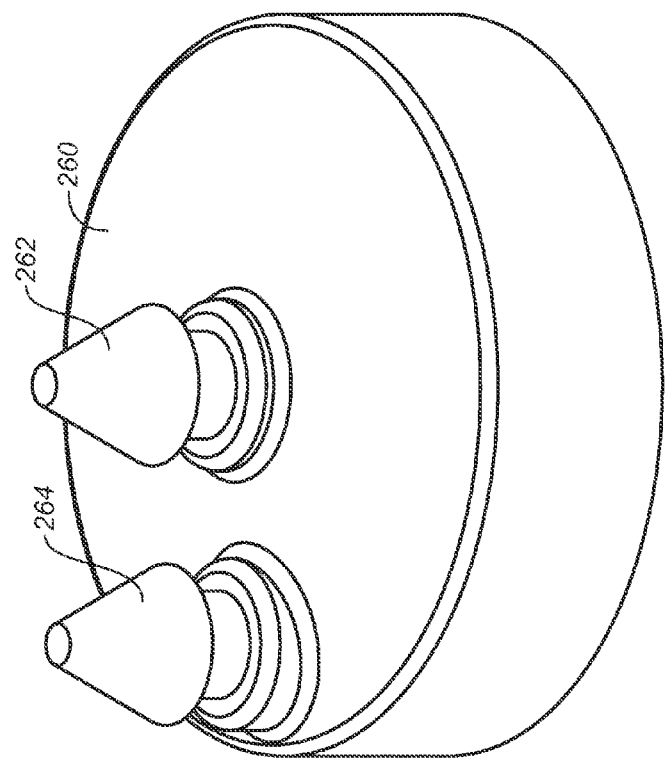
FIG. 8B is a lower perspective view thereof.

FIGS. 8A and 8B show yet another alternative top 260, this alternative adapted for assembly when the inventive apparatus is intended for use as a diverter valve. Accordingly, there are no radially oriented fluid channels, as water is not principally directed downwardly into the valve chamber for delivery to soil; rather, when the valve is open water flows through the water inlet 262 and then through water outlet 264, for sending water to a remote device, such as a dripper. A small amount of water is permitted to enter the valve chamber, as well, but only to wet the EM disc.

Figure 9:
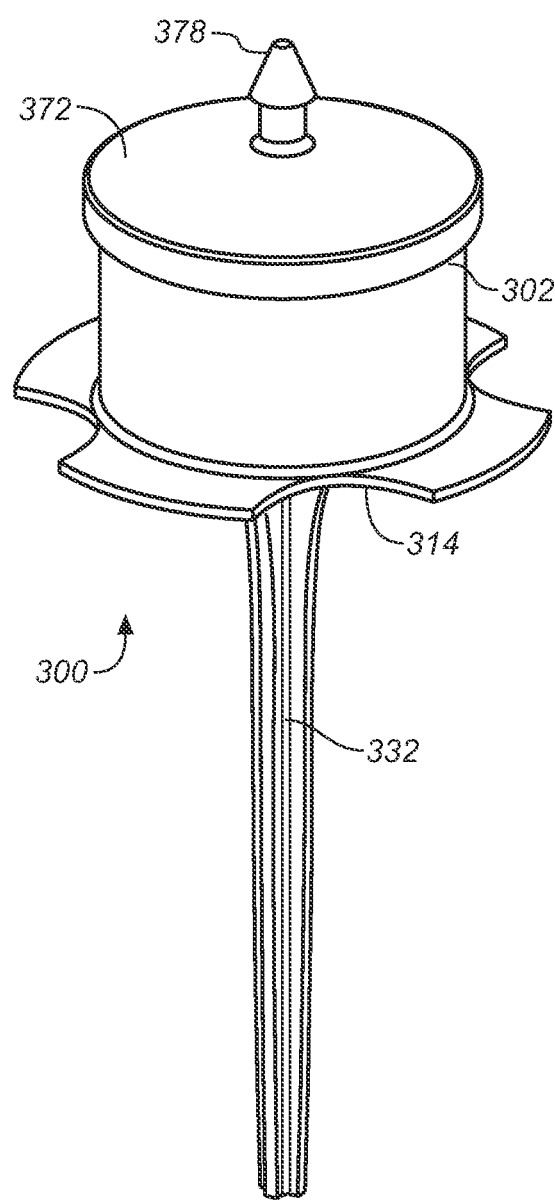
FIG. 9 is an upper perspective view of the second preferred embodiment of the drip emitter and diverter valve of the present invention, showing the indirect water contact device (IWCD)
Figure 10:
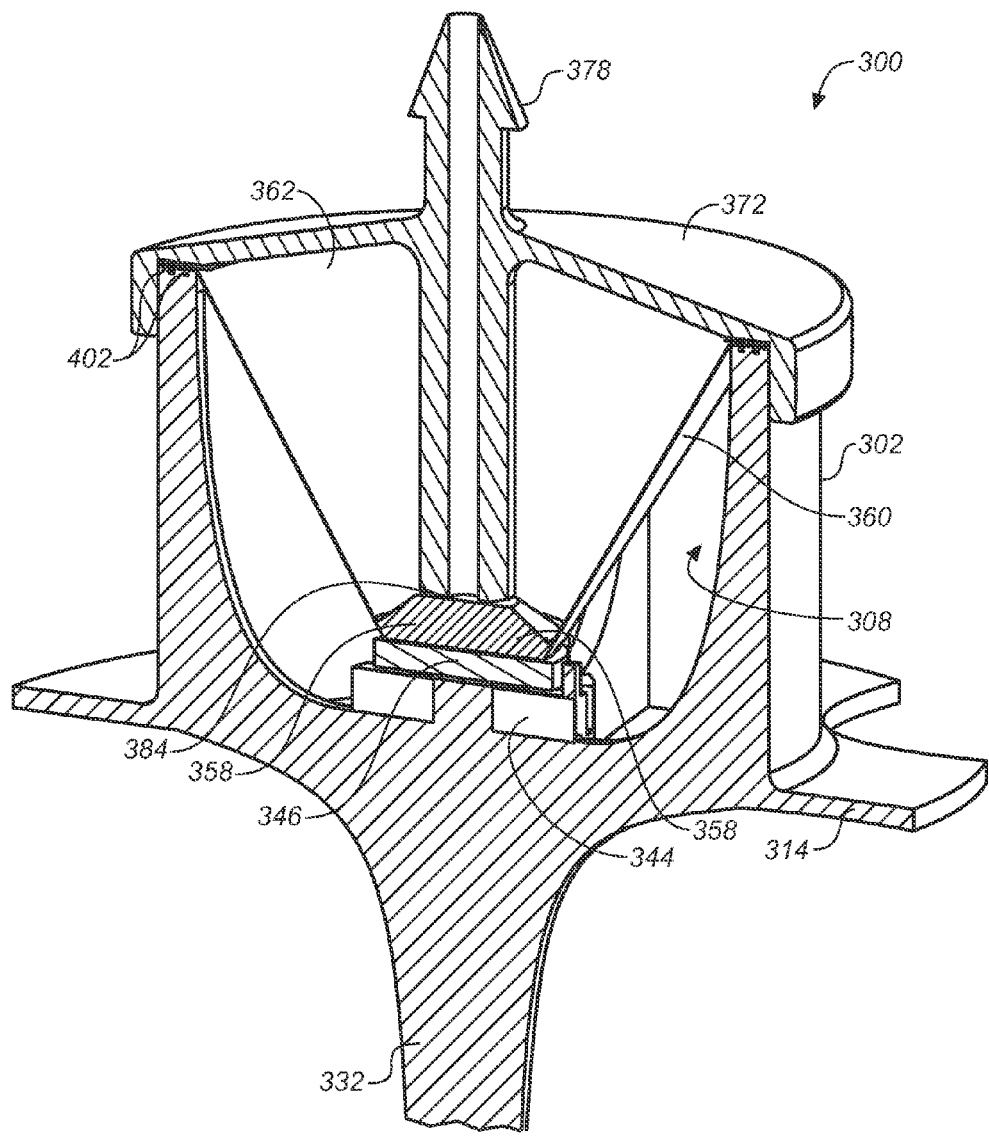
FIG. 10 is a cross-sectional perspective view of the assembled IWCD of FIGS. 9-9B.

FIGS. 9A-10 show an alternative embodiment 300 of the inventive drip irrigation system emitter or diverter valve. In nearly all respects, this embodiment is identical to that of the first preferred embodiment, with the alternate rim having micro channels, as shown in FIGS. 2A-2B. However, the valve chamber 302 is slightly deeper to accommodate a modified valve 360, which is funnel-shaped and includes a conical membrane 362 having an exterior (or lower) surface 364, a valve seal 366, and an interior (or upper) surface 368. The upper portion of the valve includes a flange extending to a perimeter rim 370 disposed above the upper rim 310 of the valve chamber 302 in the same manner as the valve membrane of the first preferred embodiment. The upper rim includes arcuate U-shaped micro-channels as described above. The bottom of the valve 360 includes an accordion valve seal 358 having a plurality of folds 357 that permits the valve to move up and down so as to open when the EM disc 346 is sufficiently dry, or to seat against the valve seat 384, which is the lower end of the water inlet 378, when the EM disc is swelled by wetting. There are, however, no openings in the bottom of the valve, so that water enters the valve chamber only by passing through the top channels 382 of the apparatus top 372, through the space between the valve flange perimeter 370 along the micro-channels 402 and then down along the interior side 308 of the valve chamber 302. Water introduced through the water inlet does not flow down along the lower surface 364 of the conical membrane. In fact, no water introduced through the water supply comes into contact with the EM disc. Instead, only water condensing on the exterior side 364 of the valve and that migrates down the valve to the EM disc will wet the disc.

The second preferred embodiment also includes a base stake 332 with splines 334 that flare out into spokes that connect to the interior side of the valve body. There is a recess formed in the center of the valve chamber in the spokes where the valve platform 344 is disposed, on which the EM disc 346 is placed. A ground plate 314 is also employed in precisely the same way as described above.

Figure 11:
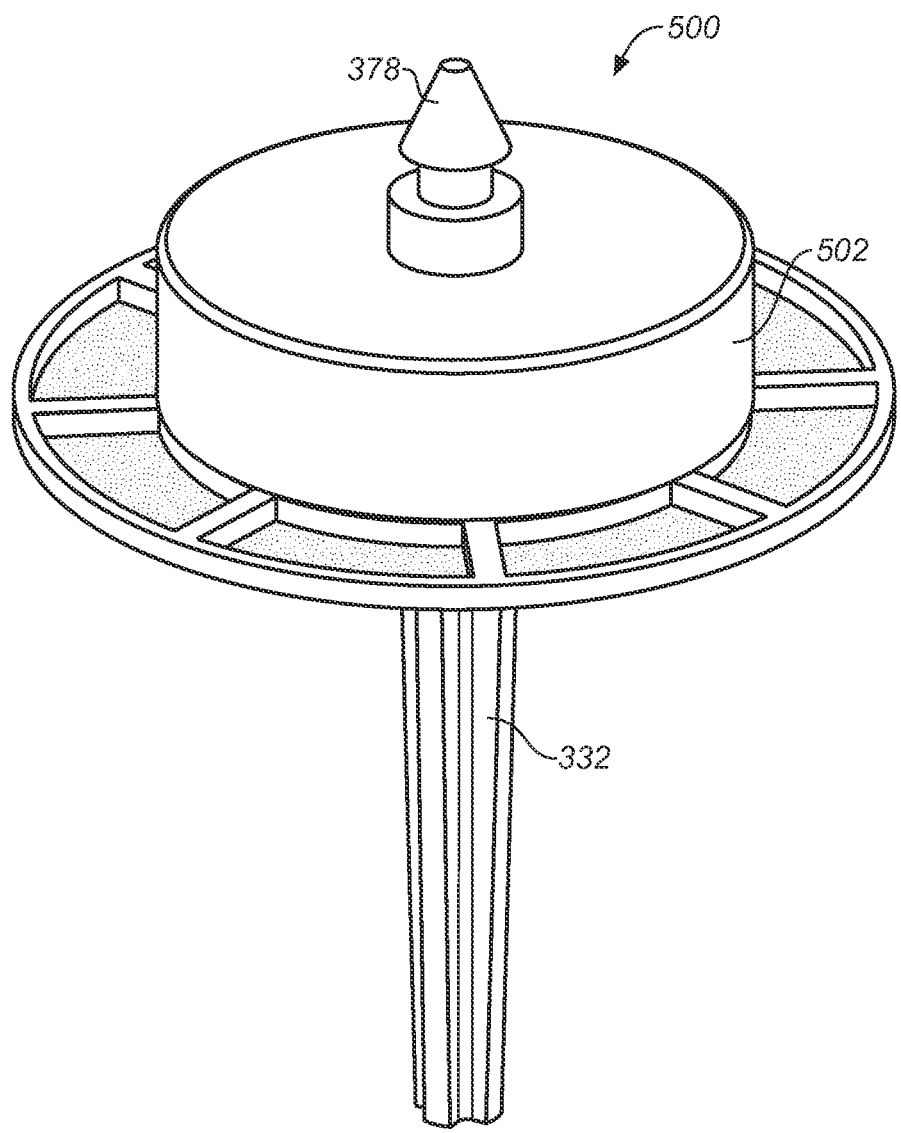
FIG. 11 is an upper perspective view showing a third preferred embodiment.

FIGS. 11-12B show a third preferred embodiment 500 of the inventive apparatus. All of the structural and functional elements of the apparatus match those of the first preferred embodiment save for the configuration of the ground plate and the placement of the fabric screen. In this embodiment, the valve chamber 502 includes a fabric screen retainer ring, which comprises a ring encircling the lower edge 504 of the valve chamber connected by a plurality of spokes 506 spaced apart so as to create air spaces 508.

Within the interior space 510 of the valve chamber 502, spokes 512 connected to the interior side 514 converge at the center 516 of the interior space and support a EM disc platform 518, which is circumscribed at spaced-apart points by pins 520 that secure the EM disc 522 and the disc shaped valve stem 524 on the underside 526 of the valve member 528. The valve seal 530 and valve seat (not shown) are configured in the same way as that shown in the first preferred embodiment.

The base stake 532 in this embodiment includes splines 534, but these do not extend into interior spokes, as in the first preferred embodiment, but instead expand and radiate outwardly at the upper portion 536 of the base stake 532 and connect to the underside 538 of a fabric screen support 540, which includes rings and spokes and air spaces, 542, 544, 546, generally matching those of the ring and spoke and air space configuration of the retainer ring 504 disposed on the valve chamber. A fabric screen 548 is placed on the screen support 540, and the retainer ring 504 is snapped onto the screen support so as to capture and secure the fabric screen.

In assembly, the EM disc 522 is placed on the EM disc platform 540 and the valve member 528 is then placed over the EM disc. A top 550 identical to any of the above-described emitter-type tops is then placed over the valve membrane and EM disc, thereby putting the valve seal into contact with the valve seat. A fabric screen 548 is placed on the screen support 540 and the screen support is snapped together with the retainer ring 504. The valve is then ready for use by connection to a drip system water supply line.

From the foregoing it will be appreciated that the inventive apparatus is designed for use with an inline dripper upstream of the device, as a diverter valve for a remote sprayer or drip emitter, or as a drip emitter itself.

It will further be appreciated that in operation the geometry of the valve member and its placement immediately above an expandable member (i.e., the valve stem disposed on the EM disc) applies an upward pressure on the valve seal so as to seat the valve on the valve seat. This sealing engagement will resist most of the pressure from incoming water, thereby reducing the degree to which the EM disc must apply pressure to seal the water inlet opening. The reduction in force required from the EM disc keeps the polymer from deforming over time.

Further, because the incoming water is exposed to a surface area of only approximately 1/16 inch in diameter when the valve is closed, the combined pressure of the resilient valve and the EM disc require very little force to keep the valve seal from disengaging from the valve seat and opening. When the EM disc is dry, water pressure from incoming water overcomes the pressure from the valve and then passes the opening at the valve seat and into the valve chamber reservoir. Once inside the interior of the valve chamber, the water is distributed over a large surface area over an inch in diameter and this multiplies the downward force it produces by a factor over 250×. This increased pressure forces the valve membrane to deflect downwardly towards the EM disc, thereby opening the valve completely.

The valve seal in the DWCD is preferably a compressible material with a durometer value of approximately Shore Hardness 50. This gives the EM disc a greater range of expansion while still maintaining the valve in a closed configuration (i.e., the valve seal sealingly engaged with the valve seat). Only when the EM disc is completely dry, or at another predetermined setting, will the valve open. In an alternative approach, a non-compressible valve seal can be co-molded with the compressible material (in the DWCD) and the valve seat can be compressible. In the IWCD embodiment, the valve may be formed from a pliable material. More on this topic below.

After water passes the valve seat it is either diverted outwardly from the center of the valve chamber to the periphery of the valve membrane and either through the lid via a hose connector (when operated as a diverter valve) or through micro-channels, which restrict its flow, to the interior of the valve chamber. The size and shape of the micro-channels can be sized and adjusted to achieve desired flow rates. Thus, water is either allowed to enter the valve chamber interior or it is diverted to the exterior.

Water entering the interior can be spayed, directed to or away from the EM depending on many factors. When configured as a drip emitter, then water is directed towards the EM disc to wet it, because as water enters the interior, it has a very low velocity. When the water has a higher velocity, it can enter the interior and is then preferably directed towards the interior side, as necessary, to avoid over saturating the EM.

In the first preferred embodiment, the DWCD, if the EM disc becomes contaminated, the micro pores in the polymeric EM can be clogged and the EM may not properly rewet as a result. However, if an EM wetting solution is added to the water distribution pipes, the EM can be unclogged. Further, the DWCD will never be left in a closed position, so that the EM material will never entirely dry out and clog.

When the device is configured as an IWCD, then water is directed away from the EM disc, either toward the interior side or the exterior side of the valve chamber.

When configured as a diverter valve for use with a remote sprayer, water still enters the interior of the valve chamber but as a drip emitter only.

In the event of a leak, which can occur if the valve is under sufficient pressure and only a few drops escape (due, for instance, to seal degradation or when the EM disc is slightly contracted), water droplets run down outlet ramps in the top and then down the interior side, dropping from the edge of the interior side lower edge and through the fabric screen, thus never wetting the EM disc. This is critical to ensure that the valve position is never thrown off by the EM disc being expanded when the soil is still dry.

The EM is disk shaped so that it will apply the greatest force perpendicular to the upper face of the disc, and it is thin enough that only a small amount of water is needed to fully expand it while also ensuring that it dries quickly.

Wicking discs may be disposed on either side of the EM disc to facilitate wetting and drying of the EM after water flow has stopped.

The grooves in the EM disc platform and the valve stem facing the EM disc trap water and keep wetting the EM disc after the water has been turned off. This also helps dry the polymer more efficiently as the soil dries. Further, because polymers expand uniformly, the radial grooves keep the edges from chaffing the polymer, thereby reducing degradation.

The valve chamber acts as a humidity chamber. When the soil is wet after watering, the humidity is at 100% within this space. The humidity prevents the EM disc from entirely drying out. Only when the soil starts to dry does the humidity in the chamber decrease, which in turn dries the EM. Eventually, the EM disc and the soil will be correspondingly dry and to a degree that will allow the valve to open again on the next timed cycle.

It will also be appreciated that the chamber is closed so in a flooding event the EM disc will not be contaminated. Its geometry acts like an upside-down cup forced underwater. However, the pocket of trapped air is small enough that the device will not float away if flooding occurs.

With the DWCD, if the EM disc becomes contaminated, the micro pores in the polymeric material can become clog and will not re-wet, because they are effectively glued shut. However, future watering cycles will clean the EM disc when a wetting solution is added to the water. It should be noted that because the expandable material will clog in its dry state, the device will never be left in the closed position.

In the preferred embodiment, the color of the device is white, which helps to regulate the internal temperature by reflecting sunlight, thereby helping the EM from premature drying and degradation. Small changes in certain elements of the design can tailor the device for industry or site-specific uses or to suit different environments and plants. For instance, a thinner fabric screen will dry the EM disc more quickly for potted plants, but a thicker or less porous fabric screen may be better suited for trees.

The IWDC embodiment of the inventive apparatus uses every aspect of the DWDC, with three main exceptions: (1) water exits the micro-channels either to the exterior or interior of the device but it never touches the EM; (2) moisture from the ground and or interior water causes condensation to occur on the underside of the conical valve membrane, and that water runs down and off the membrane to the EM disc via gravity; (3) the pool of water in the conical valve acts as a heat sink which creates the temperature differential needed for condensation to occur. This takes place usually at night.

In the IWDC, the EM disc is always exposed to clean water because minerals are not present in condensate. If water does enter the interior, it must be restricted so that it does not touch the valve exterior surface. The selected EM may be fast-acting because of the delay between the watering cycle and condensate forming; it would thereby decrease the time to close the valve compared to a polymer.

To increase cooling to the reservoir, the exterior of the valve chamber may have openings above the reservoir to facilitate evaporation, thereby cooling the reservoir more quickly. Another approach to cooling the reservoir is to make the top from a thermally conductive plastic and to include cooling fins to increase the surface area of the top that radiates heat into the outside atmosphere.

The valve is formed from a thermally conductive yet pliable material, such as OPUR foil, which is a special plastic developed by the Organisation Pour l'Utilisation de la Rosée, which is 400 micrometers (0.016 in) in thickness; it is hydrophilic and made from polyethylene mixed with titanium dioxide and barium sulfate. This hydrophobic material facilitates condensate run off so that the condensate travels down the valve to the polymeric EM disc. The exterior of the valve membrane can be textured to increase both its surface area and attractiveness to water vapor. Advantageously, the IWDC can be used with dissolved fertilizers in the water supply because the water never touches the EM disc.

When using the IWDC, timing of the on/off cycle is very important. If watering is done in the afternoon, the soil will continue radiating heat through the night. The reservoir cools quickly having less mass than the soil, so condensation forms on the conical surface.

From the foregoing, it is seen that in its most essential aspect, the inventive apparatus a drip irrigation system valve for placement directly onto soil that may function as either a drip emitter or a drip diverter valve. The apparatus includes a valve chamber defining an interior space and having an open bottom in fluid communication with the soil onto which it is placed; a water inlet in fluid communication with the interior space and having a valve seat disposed on an interior end; a base stake connected to the valve chamber for insertion into soil; a platform for supporting an expandable member; an expandable member disposed on the platform within the interior space; a valve membrane disposed within the interior space above the expandable member and having an upper side and a lower side and which defines a water reservoir within the interior space above the upper side and which prevents water entering into the valve chamber and from directly contacting the expandable membrane; and a valve seal disposed on the upper side of the valve membrane immediately above the expandable member for sealing engagement with the valve seat when the expandable member is wetted and in an expanded state.

The above disclosure is sufficient to enable one of ordinary skill in the art to practice the invention. Even so, while there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed as invention is:

1. A drip irrigation system valve for placement directly onto soil, comprising:
   a valve chamber defining an interior space and having an open bottom in fluid communication with the soil onto which it is placed;
   a water inlet in fluid communication with said interior space and having a valve seat disposed on an interior end;
   a base stake connected to said valve chamber for insertion into soil;
   a platform for supporting an expandable member;
   said expandable member disposed on said platform within said interior space;
   a valve membrane disposed within said interior space above said expandable member so as to sandwich said expandable member between said valve membrane valve and said platform, said valve membrane having an upper side which acts upon said valve seat and confines water entering said valve chamber to a reservoir portion of said interior space above said valve membrane; and
   a valve seal disposed on said upper side of said valve membrane immediately above said expandable member for sealing engagement with said valve seat when said expandable member is wetted and in an expanded state, thereby preventing water from entering into said interior space.

2. The drip irrigation system valve of claim 1, wherein when said valve is in an open state water from a connected water source directly wets said expandable material or is diverted away from said expandable material by diverters.

3. The drip irrigation system valve of claim 1, wherein said platform includes grooves for channeling water both to said expandable material, such that said grooves in said platform hold water for continued wetting of said expandable member after a watering cycle is terminated and facilitate drying said expandable member via increased open surface area.

4. The drip irrigation system valve of claim 1, further including a valve stem disposed on said lower side of said valve membrane and positioned immediately above said expandable member.

5. The drip irrigation system valve of claim 4, further including a plurality of pins disposed around said platform.

6. The drip irrigation system valve of claim 1, further including a plurality of pins disposed around said platform, said pins restricting lateral movement in said expandable member.

7. The drip irrigation system valve of claim 1, further including a fabric screen disposed immediately below said open bottom of said valve chamber.

8. The drip irrigation system valve of claim 7, further including a ground plate disposed around said valve chamber and above said fabric screen, said ground plate including a plurality of tabs and spaces therebetween, such that said fabric screen is exposed to open air in the spaces between tabs.

9. A drip irrigation system valve, comprising:
   an enclosed valve chamber having a water inlet and at least one water outlet;
   a valve seat disposed on an end of said water inlet within said valve chamber;
   an expandable member positioned in said valve chamber;
   a valve membrane separating said expandable member from said water inlet and defining a water reservoir within said valve chamber; and
   a valve seal disposed on said valve membrane above said expandable membrane so as to be urged upwardly into sealing engagement with said valve seat when said expandable member is wetted; and
   fluid channels for directing water to said expandable member,
   wherein when said expandable member is dry to a predetermined degree and in less than a fully expanded condition, said valve seal permits water to enter into said reservoir, and thereafter to pass through said valve chamber and either onto the soil or through one of said at least one water outlets.

10. The drip irrigation system valve of claim 9, wherein humidity within said valve chamber is affected by the moisture content of the soil on which said valve is placed.

11. The drip irrigation system valve of claim 10, wherein as the soil dries the humidity of the valve chamber decreases, thereby drying the expandable member.

12. The drip irrigation system valve of claim 9, wherein said valve membrane is funnel-shaped and includes a lower side and an upper side.

13. The drip irrigation system valve of claim 12, wherein said lower side provides a condensation surface for directing condensation to said expandable member.

14. The drip irrigation system valve of claim 9, wherein when said expandable member has a generally upper side to act upon said valve.

15. The drip irrigation system of claim 9, wherein said expandable member expands when wetted so as to urges said valve seal into sealing engagement with said valve seat and thereby prevents water from said water inlet from entering into said valve chamber.

16. The drip irrigation system valve of claim 9, wherein said valve chamber includes an upper rim with microchannels that create back pressure on water flowing into said valve chamber through said water inlet so as to limit the rate of fluid flow through said valve.

17. The drip irrigation system valve of claim 9, wherein said valve seal engages said valve seat until sufficient water pressure is exerted against said valve seal by water flowing through said water inlet, and such that only when said expandable member is substantially completely contracted will said valve seal unseat from said valve seat.

18. The drip irrigation system valve of claim 9, wherein said expandable member platform includes radially oriented grooves to facilitate both wetting and drying of said expandable member.

19. The drip irrigation system valve of claim 9, wherein said platform includes a plurality of pins that restrict lateral movement of said expandable member and said valve membrane.

20. A drip irrigation system drip emitter and diverter valve having an open configuration and a closed configuration, comprising:
- a valve chamber defining an interior space and having a top opening and a bottom opening through which water may be directed into soil;
- a top covering said top opening of said valve chamber;
- an expandable material platform;
- an expandable member disposed on said expandable material platform;
- a water inlet;
- a valve seat disposed at the end of said water inlet within said interior space of said valve chamber;
- a valve including a generally planar valve membrane having an upper side and a lower side and a valve seal disposed on said upper side immediately above said expandable member and configured to engage said valve seat;
- a base stake for insertion into soil and to secure the valve to the ground; and
- a fabric screen cover covering said bottom opening of said valve chamber.

\* \* \* \* \*